United States Patent
Stentiford (10) Patent No.: US 7,574,051 B2
(45) Date of Patent: Aug. 11, 2009

(54) COMPARISON OF PATTERNS (75) Inventor: Frederick W M Stentiford, Woodbridge (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 11/916,475

(22) PCT Filed: Jun. 1, 2006

(86) PCT No.: PCT/GB2006/002001

§ 371 (c)(1),
(2), (4) Date: Dec. 4, 2007

(87) PCT Pub. No.: WO2006/131701

PCT Pub. Date: Dec. 14, 2006

(65) Prior Publication Data

US 2008/0205760 A1 Aug. 28, 2008

(30) Foreign Application Priority Data

Jun. 10, 2005 (EP) .................................. 05253589

(51) Int. Cl.
*G06K 9/68* (2006.01)

(52) U.S. Cl. ........................ 382/218; 382/100; 382/181; 382/209; 382/305; 382/144; 707/100; 358/1.9

(58) Field of Classification Search ................. 382/100, 382/181, 218, 219, 144, 305, 274; 358/1.9; 707/100
See application file for complete search history.

(56) References Cited

U.S. PATENT DOCUMENTS 4,646,352 A 2/1987 Asai et al.

(Continued)

FOREIGN PATENT DOCUMENTS

| EP | 0098152 | 1/1984 |
|---|---|---|
| EP | 1126411 | 8/2001 |
| EP | 1286539 | 2/2003 |

(Continued)

OTHER PUBLICATIONS

Zhao D, Shridhar M., Daut D. G., "Morphology on Detection of Calcifications in Mammograms," Digital Signal Processing 2, Estimation, VLSI, San Francisco, Mar. 23-26, 1992, Proceedings of the International Conference on Acoustics, Speech and Signal Processing (ICASSP), New York, IEEE, US-ISBN 0-7803-0532-9, vol. 5, Conf. 17, pp. 129-132.

(Continued)

*Primary Examiner*—Matthew C Bella
*Assistant Examiner*—Ali Bayat
(74) *Attorney, Agent, or Firm*—Nixon & Vanderhye PC (57) ABSTRACT

A first visual image or other pattern (A) is represented by a first ordered set of elements ($x_i$) each having a value and a second pattern (B) is a represented by a second ordered set of element ($u_i$) each having a value. Iteratively, a comparison is made by: (i) selecting a plurality of elements from the first ordered set;(ii) for each selected element of the first ordered set, selecting an element from the second ordered set, such that the selected elements of the second ordered set have, within the second ordered set, a set of positional relationships relative to each other that is the same as, or a transformation of, the set of positional relationships that the selected plurality of elements of the first ordered set have relative to each other; (iii) selecting a random shift value (γ); and (iv) determining whether the selected elements meet the match criterion that the value of each of the selected elements of the first ordered set differs from the value of the correspondingly positioned selected element of the second ordered set by an amount that is equal to, or within a set margin of, and in the same sense as, said shift value. In the event of a match, a similarity score ($S_{AB}$) is updated. Alternatively, or in addition, the shift amount in the event of a match is recorded and, at the conclusion of the iteration, a single representative shift value is estimated from said recorded shift value.

7 Claims, 6 Drawing Sheets

U.S. PATENT DOCUMENTS

| | | | |
|---|---|---|---|
| 5,113,454 A | | 5/1992 | Marcantonio et al. |
| 5,200,820 A | | 4/1993 | Gharavi |
| 5,703,968 A | * | 12/1997 | Kuwahara et al. ............ 382/269 |
| 5,790,413 A | | 8/1998 | Bartusiak et al. |
| 5,825,016 A | | 10/1998 | Nagahata et al. |
| 5,867,813 A | | 2/1999 | Di Pietro et al. |
| 5,978,027 A | | 11/1999 | Takeda |
| 6,091,844 A | | 7/2000 | Fujii et al. |
| 6,094,507 A | | 7/2000 | Monden |
| 6,111,984 A | | 8/2000 | Fukasawa |
| 6,240,208 B1 | | 5/2001 | Garakani et al. |
| 6,260,059 B1 | * | 7/2001 | Ueno et al. .................. 709/202 |
| 6,266,676 B1 | | 7/2001 | Yoshimura et al. |
| 6,282,317 B1 | | 8/2001 | Luo et al. |
| 6,304,298 B1 | | 10/2001 | Steinberg et al. |
| 6,389,417 B1 | | 5/2002 | Shin et al. |
| 6,480,629 B1 | * | 11/2002 | Bakhmutsky ............... 382/236 |
| 6,483,937 B1 | * | 11/2002 | Samuels ..................... 382/144 |
| 6,778,699 B1 | | 8/2004 | Gallagher |
| 6,934,415 B2 | | 8/2005 | Stentiford |
| 7,142,689 B2 | * | 11/2006 | Hayashi et al. ............. 382/100 |
| 2001/0013895 A1 | | 8/2001 | Aizawa et al. |
| 2001/0030759 A1 | * | 10/2001 | Hayashi et al. .............. 358/1.9 |
| 2002/0081033 A1 | | 6/2002 | Stentiford |
| 2002/0126891 A1 | | 9/2002 | Osberger |
| 2002/0168117 A1 | | 11/2002 | Lee et al. |
| 2005/0031178 A1 | | 2/2005 | Park |
| 2005/0074806 A1 | | 4/2005 | Skierczynski et al. |
| 2005/0169535 A1 | | 8/2005 | Stentiford |
| 2006/0050993 A1 | | 3/2006 | Stentiford |
| 2007/0116354 A1 | | 5/2007 | Stentiford |
| 2008/0075372 A1 | | 3/2008 | Stentiford |

FOREIGN PATENT DOCUMENTS

| | | |
|---|---|---|
| GB | 1417721 | 12/1975 |
| JP | 03-238566 | 10/1991 |
| JP | 06-245064 | 9/1994 |
| JP | 07-027537 | 1/1995 |
| JP | 10-260773 | 9/1998 |
| JP | 2000-207420 | 7/2000 |
| JP | 2000-512790 | 9/2000 |
| JP | 2002 050066 | 2/2002 |
| JP | 2003-187217 | 7/2003 |
| WO | 82/01434 | 4/1982 |
| WO | 90/03012 | 3/1990 |
| WO | 99/05639 | 2/1992 |
| WO | 98/47061 | 10/1998 |
| WO | 99/60517 | 11/1999 |
| WO | 00/33569 | 6/2000 |
| WO | 01/31638 | 5/2001 |
| WO | 01/61648 | 8/2001 |
| WO | 02/21446 | 4/2002 |
| WO | 02/098137 | 12/2002 |
| WO | 03/081523 | 10/2003 |
| WO | 03/081577 | 10/2003 |
| WO | 2004/042645 | 5/2004 |
| WO | 2004/057493 | 7/2004 |
| WO | 2005/057490 | 6/2005 |
| WO | 2006/030173 | 3/2006 |
| WO | 2006/131701 | 12/2006 |
| WO | 2007/012798 | 2/2007 |
| WO | 2007/071918 | 6/2007 |

OTHER PUBLICATIONS

Brown, L.G., A survey of image registration techniques, ACM Computing Surveys, vol. 24, No. 4 (Dec. 1992), pp. 325-376.

Lutton, E., Maitre, H. and Lopez-Krahe, J., "Contribution to the determination of vanishing points using Hough transform," IEEE Trans. On Pattern Analysis and Machine Intelligence, vol. 16, No. 4, p. 430-438 (Apr. 1994).

Santini S. and Jain R., Similarity Matching, in Proc $2^{nd}$ Asian Conference on Computer Vision, pp. II 544-548, IEEE, 1995.

Mclean, G.F., and Kotturi, D., "Vanishing point detection by line clustering," IEEE Trans. On Pattern Analysis and Machine Intelligence, vol. 17, No. 11, pp. 1090-1095, Nov. 1995.

Guoyou Wang et al., "Efficient method for multiscale small target detection from a natural scene," Optical Engineering, Soc. Of Photo-Optical Instrumentation Engineers, Bellingham, US-ISSN 0091-3286, vol. 35, Nr. 3 (Mar. 1, 1996), pp. 761-768.

Koizumi T., Chun H-S, Zen H., "A new optical detector for a high-speed AF control", IEEE Transactions on Consumer Electronics, IEEE Inc., New York, US, ISSN 0098-3063, vol. 42, Nr. 4 (Nov. 1996), pp. 1055-1061.

Yong Rui, Huang T.S. Mehrotra S., Ortega M., "A relevance feedback architecture for content-based multimedia information retrieval systems," Proceedings IEEE Workshop on Content-Based Access of Image and Video Libraries, 1997, San Juan, Puerto Rico, Jun. 20, 1997, Los Alamitos, CA, USA, IEEE Comput. Soc. US, ISBN 0-8186-7981-6, pp. 82-89.

Rohwer R., Morciniec M., "The Theoretical and Experimental Status of the n-tuple Classifier," Neural Networks, Elsevier Science Publishers, Barking, GB-ISSN 0893-6080, vol. 11, No. 1 (Jan. 1998), pp. 1-14.

Walker et al., "Locating salient facial features using image invariants," Proc. $3^{rd}$ IEEE International Conference on Automatic Face and Gesture recognition, 1998, pp. 242-247.

Mahlmeister et al., "Sample-guided progressive image coding," Proc. Fourteenth Int. Conference on Pattern Recognition, Aug. 16-20, 1998, p. 1257-1259 vol. 2.

Osberger, W. and Maeder, A. J., "Automatic identification of perceptually important regions in an image," Proc. Fourteenth Int. Conference on Pattern Recognition, Aug. 16-20, 1998, pp. 701-704, vol. 1.

Buhmann, J. M., "Dithered Colour Quantisation", EUROGRAPHJICS 98, Sep. 1998 http://opus.tu-bs.de/opus/volltexte/2004/593/pdf/TR-tubs-cg-1998-01.pdf.

Rui Y. et al., "Relevance feedback: a power tool for interactive content-based image retrieval," IEEE transactions on Circuits and Systems for Video Technology, IEEE Inc., New York, US, ISSN 1051-8215, vol. 8, Nr. 5 (Sep. 1, 1998), pp. 644-655.

M.E.J. Wood, N.W. Campbell and B.T. Thomas, Iterative Refinement by Relevance Feedback in Content-Based Digital Image Retrieval, Proceedings of the Sixth ACM International Conference on Multimedia, Sep. 12, 1998, pp. 13-20.

Gallet O., Gaussier P., Cocquerez J-P, "A model of the visual attention to speed up image analysis," Proceedings of the 1998 IEEE International Conference on Image Processing (ICIP-98), Chicago, Illinois, Oct. 4-7, 1998. IEEE Computer Society, 1998, ISBN 0-8186-8821-1, vol. 1, pp. 246-250.

Itti, L., Koch, C. and Niebur, E., "A model of saliency-based visual attention for rapid scene analysis," IEEE Trans on Pattern Analysis and Machine Intelligence, vol. 20, No. 11, pp. 1254-1259, Nov. 1998.

Shufelt, J.A., "Performance evaluation and analysis of vanishing point detection techniques," IEEE Trans. On Pattern Analysis and Machine Intelligence, vol. 21, No. 3, pp. 282-288, 1999.

K. Curtis, P.W. Foster, and F.W.M. Stentiford, "Metadata—the key to content management services," 3$^{rd}$ IEEE Metadata Conference, Apr. 6-7, 1999.

F.W.M. Stentiford, "Evolution: the best possible search algorithm?" BT Technology Journal, vol. 18, No. 1, Jan. 2000 (Movie Version).

Wixson L., IEEE Transactions on Pattern Analysis and Machine Intelligence, IEEE Inc., New York, U.S., ISSN 0162-8828, vol. 22, Nr. 8 (Aug. 2000), pp. 774-780.

Rother, C., "A new approach for vanishing point detection in architectural environments," 11th British Machine Vision Conference, Bristol, UK, http://www.bmva.ac.uk/bmvc/2000/papers/p39.pdf.

Privitera et al., "Algorithms for defining visual regions-of-interest: comparison with eye fixations," IEEE Trans. On Pattern Analysis and Machine Intelligence, vol. 22, No. 9 (Sep. 2000), pp. 970-982.

Zhao, W. et al., "Face recognition: A Literature Survey," CVLK Technical Report, University of Maryland, Oct. 2000. ftp://ftp.cfar.umd.edu/TRs/CVL-Reports-2000/TR4167-zhao.ps.gz.

Raeth P. G. et al, "Finding Events Automatically in Continuously Sampled Data Streams via Anomaly Detection," Proceedings of the IEEE 2000 National Aerospace and Electronics Conference. NAECON, Oct. 10-12, 2000. pp. 580-587.

Smeulders, A.W.M.; Worring, M.; Santini, S; Gupta, A.; Jain,R.; "Content-based image retrieval at the end of the early years," IEEE Transactions on Pattern Analysis and Machine Intelligence, IEEE, Inc., New York, US, ISSN 0162-8828, vol. 22, Nr. 12 (Dec. 2000), pp. 1349-1380.

Sebastian, T. B. et al. "Recognition of Shapes by Editing Shock Graphs", Proc. ICCV 2001, pp. 755-762.

Vailaya A et al., Image Classification for Content-Based Indexing, IEEE Trans on Image Processing, vol. 10, No. 1, pp. 117-130, Jan. 2001.

L-Q. Xu, J. Zhu, and F. W. M. Stentiford, "Video summarization and semantic editing tools," in Storage and Retrieval for Media Databases, Proc SPIE vol. 4315, San Jose, Jan. 21-26, 2001.

Stentiford, F.W.M., "An estimator for visual attention through competitive novelty with application to image compression," Picture Coding Symposium, Seoul, pp. 101-104, 2001. http://www.ee.ucl.ac.uk/~fstentif/PCS2001.pdf.

F. W. M. Stentiford, *"An evolutionary programming approach to the simulation of visual attention,"* Congress on Evolutionary Computation, Seoul, May 27-30, 2001 pp. 851-858.

Cantoni, V., Lombardi, L., Porta, M., and Sicard, N., "Vanishing point detection: representation analysis and new approaches," 11$^{th}$ Int. Conf. on Image Analysis and Processing, Palermo, Italy, Sep. 26-28, 2001.

Ouerhani et al., "Adaptive colour image compression based on visual attention", Proc. 11th Int. Conference on Image Analysis and Processing, Sep. 26-28, 2001, pp. 416-421.

M. Russ, I. Kegel, and F. W. M. Stentiford, *"Smart Realisation: delivering content smartly,"* J. Inst. BT Engineers, vol. 2, Part 4, pp. 12-17, Oct.-Dec. 2001.

F. W. M. Stentiford, N. Morley, and A. Curnow, *"Automatic identification of regions of interest with application to the quantification of DNA damage in cells,"* in *Human Vision Electronic Imaging VII*, B. E. Rogowitz, T. N. Pappas, Editors, Proc SPIE vol. 4662, pp. 244-253, San Jose, Jan. 20-26, 2002.

A. P. Bradley and F. W. M. Stentiford, *"JPEG 2000 and region of interest coding,"* Digital Imaging Computing—Techniques and Applications, Melbourne, Australia, Jan. 21-22, 2002.

M. Roach, J. Mason, L-Q. Xu, F. W. M. Stentiford, "Recent trends in video analysis: a taxonomy of video classification problems," 6th IASTED Int. Conf. on Internet and Multimedia Systems and Applications, Hawaii, Aug. 12-14, 2002, pp. 348-353.

A. P. Bradley and F. W. M. Stentiford, "Visual attention for region of interest coding in JPEG 2000," Journal of Visual Communication and Image Representation, vol. 14, pp. 232-250, 2003. A. P. Bradley and F. W. M. Stentiford, *"Visual attention for region of interest coding in JPEG 2000,"* Journal of Visual Communication and Image Representation, vol. 14, pp. 232-250, 2003.

F. W. M. Stentiford, "An attention based similarity measure with application to content based information retrieval," in Storage and Retrieval for Media Databases 2003, M. M. Yeung, R. W. Lienhart, C-S Li, Editors, Proc SPIE vol. 5021, Jan. 20-24, Santa Clara, 2003.

Almansa, A., and Desolneux, A., "Vanishing point detection without any a priori information" IEEE Trans. on Pattern Analysis and Machine Intelligence, vol. 25, No. 4, pp. 502-506, Apr. 2003.

F. W. M. Stentiford, "An attention based similarity measure for fingerprint retrieval," Proc. 4th European Workshop on Image Analysis for Multimedia Interactive Services, pp. 27-30, London, Apr. 9-11, 2003.

Okabe, T. ey al, "Object Recognition based on Photometric Alignment using Ransac", Proceedings 2003 IEEE Conference on Computer Vision and Pattern Recognition, CVPR 2003 vol. 2, pp. 221-228, Jun. 19-20, 2003.

F. W. M. Stentiford, *"The measurement of the salience of targets and distractors through competitive novelty,"* 26$^{th}$ European Conference on Visual Perception, Paris, Sep. 1-5, 2003. (*Poster*).

O. Oyekoya and F. W. M. Stentiford, "Exploring human eye behaviour using a model of visual attention," International Conference on Pattern Recognition 2004, Cambridge, Aug. 23-26, 2004, pp. 945-948.

F. W. M. Stentiford, "A visual attention estimator applied to image subject enhancement and colour and grey level compression," International Conference on Pattern Recognition 2004, Cambridge, Aug. 23-26, 2004, pp. 638-641.

Rasmussen, C., "Texture-based vanishing point voting for road shape estimation," British Machine Vision Conference, Kingston, UK, Sep. 2004. http://www.bmva.ac.uk/bmvc/2004/papers/paper_261.pdf.

Finlayson, G. et al.."Illuminant and Device Invariant Colour using histogram Equalisation", Pattern Recognition, vol. 38, No. 2 (Feb. 2005), pp. 179-190.

F. W. M. Stentiford, "Attention based facial symmetry detection," International Conference on Advances in Pattern Recognition, Bath, UK, Aug. 22-25, 2005.

F. W. M. Stentiford, "Attention based symmetry in colour images," IEEE International Workshop on Multimedia Signal Processing, Shanghai, China, Oct. 30-Nov. 2, 2005.

International Search Report for PCT/GB2006/002001 mailed Sep. 11, 2006.

* cited by examiner

COMPARISON OF PATTERNS

This application is the U.S. national phase of International Application No. PCT/GB2006/002001 filed 1 Jun. 2006 which designated the U.S. and claims priority to European Patent Application No. 05253589.5 filed 10 Jun. 2005, the entire contents of each of which are hereby incorporated by reference.

BACKGROUND

1. Technical Field

The present invention is concerned with comparing one pattern with another, and is of particular interest in the comparison of two-dimensional patterns such as visual images, although applicable also to one-dimensional patterns and patterns having three or more dimensions.

2. Related Art

Some techniques for analysis of images or other patterns where the pattern is compared with other parts of the same pattern are described in our earlier patent applications as follows.

European patent application 00301262.2 (publication No. 1126411);
International patent application PCT/GB01/00504 (publication No. WO 01/61648);
International patent application PCT/GB01/03802 (publication No. WO02/21446));
U.S. patent application Ser. No. 977,263/09 filed 16 Oct. 2001 (publication No. 20020081033);
as well as the following papers published by the inventor:
Stentiford F W M, "An estimator for visual attention through competitive novelty with application to image compression", Proc. Picture Coding Symposium 2001, Seoul, 25-27 April, pp 101-104, 2001.
Stentiford F W M, "An evolutionary programming approach to the simulation of visual attention", Proc. Congress on Evolutionary Computation 2001, Seoul, pp 851-858, 27-30 May 2001.

Methods and apparatus for comparing patterns are described in our earlier international patent application WO03/081532 and our co-pending international patent application WO2006/030173.

BRIEF SUMMARY

Aspects of the present invention are set out in the claims.

BRIEF DESCRIPTION OF THE DRAWINGS

Some embodiments of the present invention will now be described, with reference to the accompanying drawings, wherein.

DETAILED DESCRIPTION OF EXEMPLARY EMBODIMENTS

Figure 1:
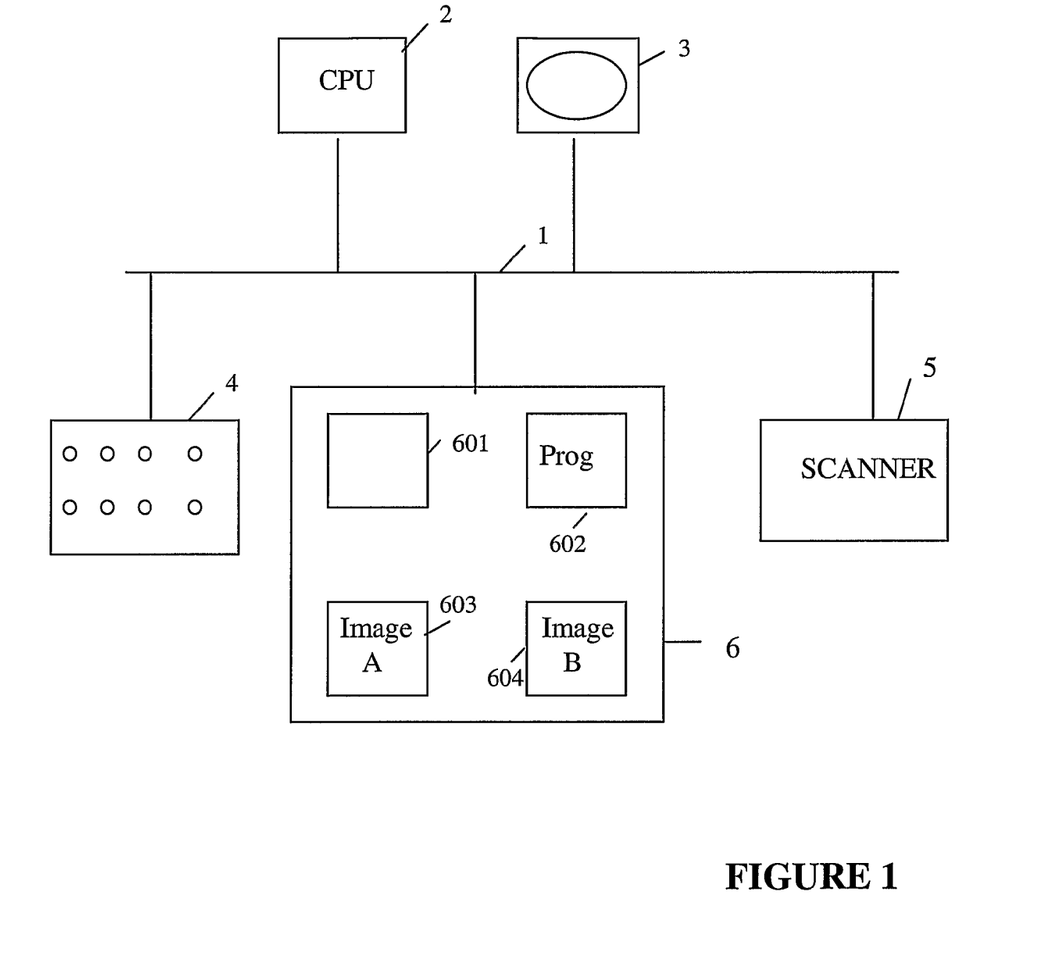
FIG. 1 depicts computer apparatus suitable for practice of this invention.

FIG. 1 shows an apparatus consisting of a general purpose computer programmed to perform image analysis according to a first embodiment of the invention. It has a bus 1, to which are connected a central processing unit 2, a visual display 3, a keyboard 4, a scanner 5 (or other device, not shown) for input of images, and a memory 6.

In the memory 6 are stored an operating system 601, a program 602 for performing the image analysis, and storage areas 603, 604 for storing two images, referred to as image A and image B. Each image is stored as a two-dimensional array of values, each value representing the brightness and/or colour components of a picture element within the array. It will be understood, however that the apparatus might more generally be arranged to analyse data sets other than images, in which case the storage areas 603, 604 would each contain a data set A, B, each being an ordered set of values, ordered in any number of dimensions (the same number of dimensions in each set).

Figure 2A:
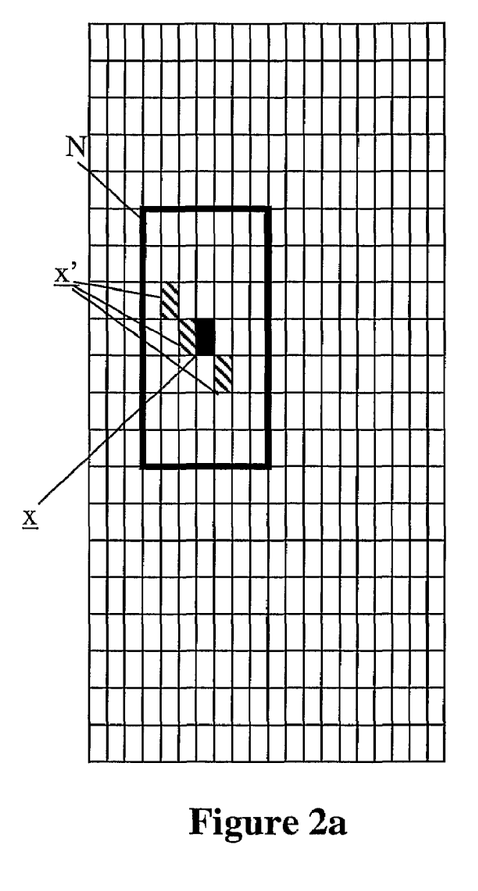
FIGS. 2a and 2b depict image arrays stored in the memory of FIG. 1.
Figure 2B:
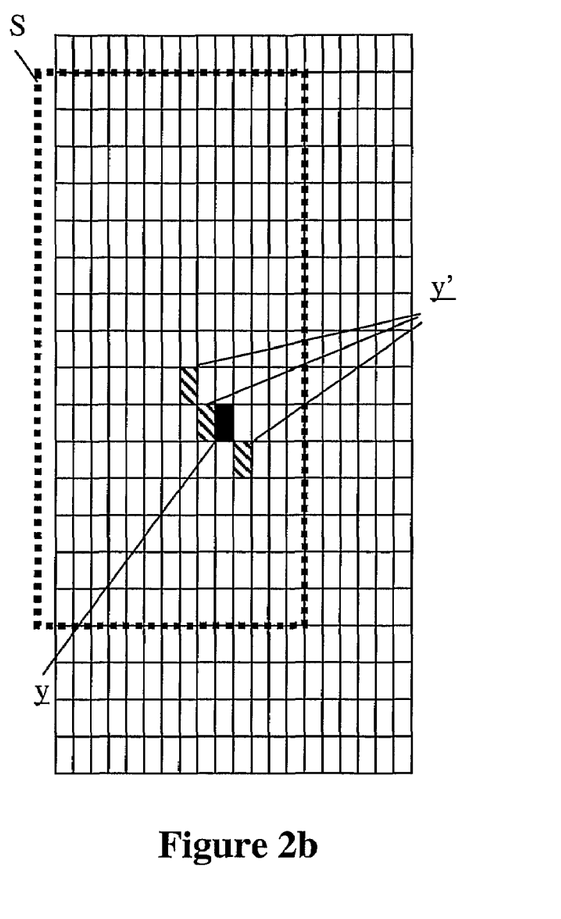

The image arrays are shown schematically in FIGS. 2a and 2b. Image A consists of an array of picture elements $x_i = (x_i, y_i)$ where $x_i$ and $y_i$ are the horizontal and vertical positions of the elements within the image. A 20×20 array is shown, for the purposes of illustration. In the general case, $x_i = (x_{i1}, x_{i2}, x_{i3}, \ldots x_{in})$ where $x_{ij}$ are the n coordinates of $x_i$ in n dimensions. Each element has a respective value $a = a(x_i)$. This may be a scalar value a or vector (multidimensional) value a. In the case of an image these would be the brightness a, or alternatively a set of colour components such as (in r,g,b representation) $a = (a_r, a_g, a_b)$ Similarly, the image B consists of an array of picture elements $u_i = (u_i, v_i)$ having brightness values $b(u_i)$ or colour vectors $b(u_i)$. In the general case, $u_i = (u_{i1}, u_{i2}, u_{i3}, \ldots u_{in})$.

Figure 3:
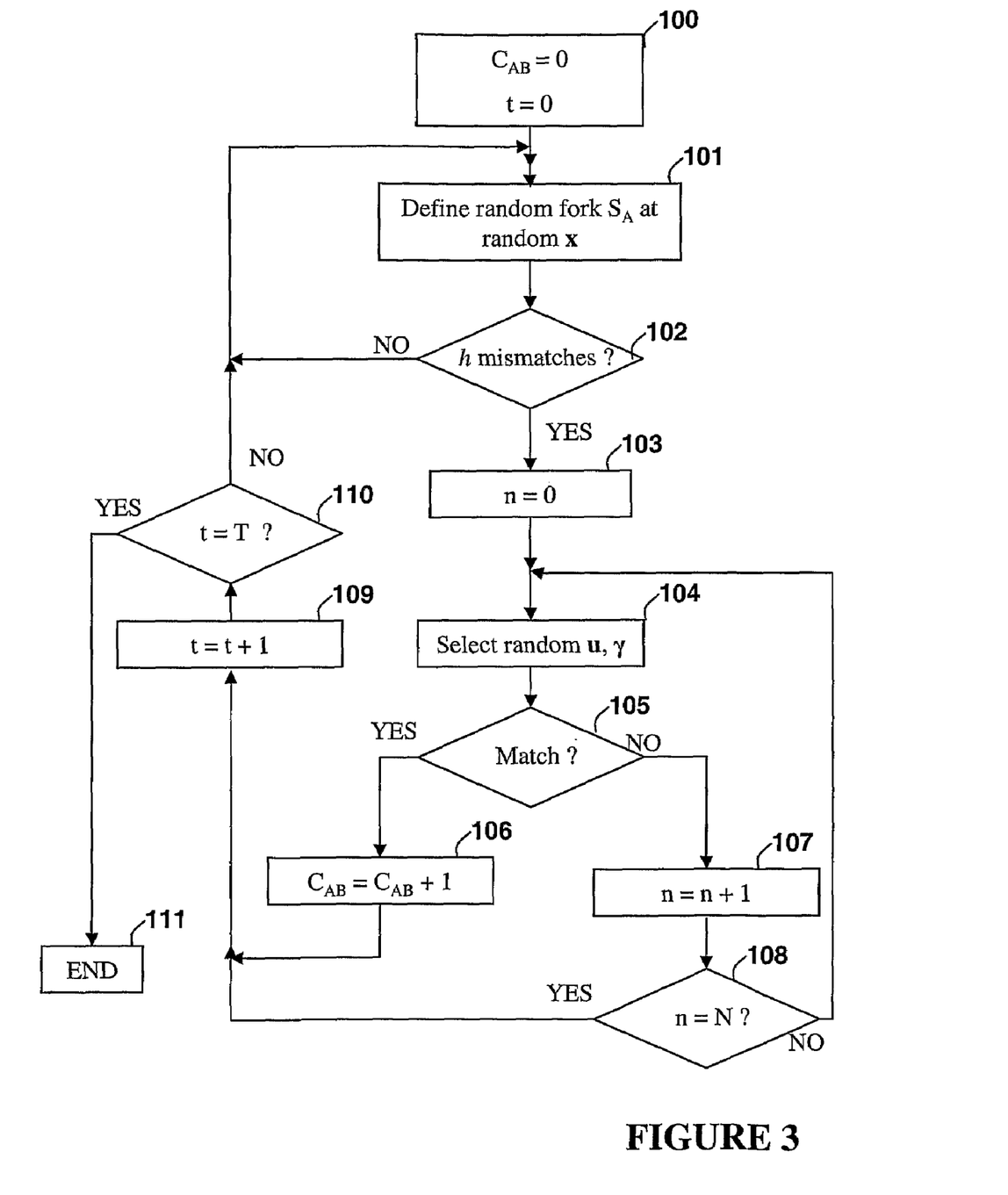
FIGS. 3-5 depict flow charts of processes involved in some aspect of the invention.

FIG. 3 is a flowchart explaining the application of the method as applied to two-dimensional images A, B. In Step 100, a score $C_{AB}$ is set to zero, and a counter t set to zero.

The first task of the method is to make a random selection of elements in image A. This may be visualised as stabbing the image with an irregular fork having m tines. The actual number m of elements may be fixed, or if preferred could be selected at random within a range $m_{min} \leq m \leq m_{max}$. The fork size may be limited by a diameter D, which could be fixed or selected as a random number $D_{min} \leq D \leq D_{max}$. Other approaches to varying the distribution of fork size are discussed in our above-mentioned U.K. patent application 0420727.0. Note that, throughout this specification, references to a random selection also envisage the possibility of selection by means of a pseudo-random process. Also, a reference to random selection envisages the possibility not only of a random selection for which the selection of any value (within a range specified) is equally probable, but also of a selection in accordance with a non-uniform probability distribution.

At Step 101 a set $N_X$ of m elements at random positions $x_i$ is selected in image A, subject to the constraint that all elements lie within the image. If desired, the elements may be constrained to lie within a certain distance of one another, though this is not essential. One possible method of doing this is as follows:

a) Choose a random element $x_0$ in A.
b) Choose a set of random displacements $d_i = (d_{xi}, d_{yi})$, where $0 \leq d_{xi} \leq D/2$ and $0 \leq d_{yi} \leq D/2$.
c) If the Euclidean distance $|d_i| \leq D/2$ for all i, then continue; otherwise repeat the previous step for any i needing it until this condition is satisfied. Where $|d_i| = \sqrt{\{d_{xi}^2 + d_{yi}^2\}}$.
d) Compute positions $x_i = x_0 + d_i$
e) If any $x_i$ lies outside the image area, repeat steps (b) to (e) in respect of the offending $d_i$.

Note that this process permits the occurrence of one or more pairs $x_i=x_j$ $i \neq j$ i.e. the $x_i$ are not constrained to be distinct. This is not objectionable in practice but if desired may be eliminated by testing for it and reselecting one member of the matching pair in the same way as for elements falling outside the image area.

Step 102 is optional and will be described later. At 103, a counter n is initialised to zero. The next stage (Step 104) is to make a selection $N_u$ of m elements $u_i$ within image B, at a random overall position, but having the same positions relative to one another as the selected elements of image A. That is, $x_i-x_j=u_i-u_j$ for all i,j. This may be visualised as stabbing image B with the same fork as used on image A.

Assuming that a set of displacements $d_i$ has been calculated as above, this can be done by:

Choose a random element $u_0$ in B.
Compute positions $u_i=u_0+d_i$
If any ui lies outside the image area, repeat these steps in respect of the offending $d_i$.

It is to be determined whether each of the selected elements in image A matches the element having the same relative position in image B. First, however, a random colour shift γ is chosen. In the case of monochrome image this would simply be a brightness shift but in the colour case it requires selection of a random shift value for each colour axis, e.g., in an r, g, b system, $$\gamma=(\gamma_r, \gamma_g, \gamma_b)$$

where each shift $\gamma_r$, $\gamma_g$, $\gamma_b$ is selected to lie in the range $-\gamma_{MAX}$ to $+\gamma_{MAX}$ (different ranges could be defined for the different colour components if desired—for example in y, u, v systems one range might be chosen for the luminance and a different range for the chrominance values). Supposing that the colour components take values in the range 0 to 255, then a typical value for $\gamma_{MAX}$ might be 64, or perhaps 128.

The test for a match occurs at Step 105. In the r, g, b case a match occurs if $$\text{Dist}[a(x_i)-b(u_i)+\gamma]<\delta \text{ for all } i=1 \ldots m$$

Where Dist is some distance operator (e.g. Euclidean or city-block), or the vector components may be thresholded separately, e.g. for colour components the match condition would be $$|a_r(x_i)-b_r(u_i)+\gamma_r|<\delta_r \text{ and}$$

$$|a_g(x_i)-b_g(u_i)+\gamma_g|<\delta_g \text{ and}$$

$$|a_b(x_i)-b_b(u_i)+\gamma_b|<\delta_b \text{ for all } i=1 \ldots m$$

where $\delta_r$, $\delta_g$ and $\delta_b$ are some small threshold values which will commonly be equal.

If a match occurs, then at Step 106 the Score $C_{AB}$ is incremented. It could simply be incremented by 1 (or other fixed value).

Once the score has been updated, then the iteration counter t is incremented at 109 and tested at 110 to see if it has reached a maximum iteration count T, and if so, the process terminates. Otherwise the process returns to Step 101 for a further iteration. If no match occurs, then the fork is retained and the process repeats from 104. However this repetition with the same $x_i$ is subject to a limit of N iterations: the counter n is incremented at 107 and if at 108 it reaches N then control passes to 109 for a fresh fork.

The result of this process is the final value of $C_{AB}$, which is a score indicating the degree of similarity between image A and image B. As compared with the method described in our international patent application WO03/081523, this method has the advantage that a high score can be obtained despite the fact that there may be differences in colour between the two images, due for example to differences in lighting.

In the case of images A, B both containing large plain areas of similar brightness (or colour), a large number of matches and hence a high score might be obtained even though there may be little similarity between the parts of the image that contain detail. In this case, the process need not necessarily be carried out for the whole image. For example, if regions of images A and B have been identified as being of special interest—perhaps using the method described in one of our earlier patent applications referred to above—then the picture elements x, u dealt with may be just those lying in the vicinity of the identified region. This could be implemented by constraining the selection of x and u such that at least one element $x_i$ is an element of a special interest region of image A and at least one element $u_i$ is an element of a special interest region of image B. This means that each match establishes a similar relationship in each image between the foreground and background, or foreground and foreground (if all tines lie on high interest pixels). Small diameter forks will tend to obtain similarities between localised regions in A and B, and larger forks will determine global relationships between foreground and background.

Alternatively, we find that improved results can be obtained if the process is biased towards making comparisons involving the more detailed parts of the image, and with this in mind, the operation represented in Step 102 serves to test each new fork to determine whether, when it is in its initial position in image A, each of its tines points at an element that differs by at least a threshold amount from those pointed at by at least h of its other tines. This is shown in detail in FIG. 4. Counters q, p are initialised at 200, 201 so each distinct combination of p and q represents a pair of tines of the fork. The process then enters a loop where at 202 the picture elements at the corresponding two points in image A are compared to see whether they differ by more than a threshold amount. If not, then p is incremented (205) until it exceeds m (206) and the comparison repeated. If the values match, then a match counter Z is incremented at 203. As long as (204) the counter Z has not reached h, then the comparison is again repeated for a new value of p. Once Z has reached h, it has been established that picture element $x_q$ differs significantly from at least h others in the fork and at 208, 209 Z is reset and q advanced for a further iteration. If all values of q result in a value of z that reaches h, then the test is passed (211). But is any value of q fails to result in Z reaching h them the tests fails 207.

Figure 4:
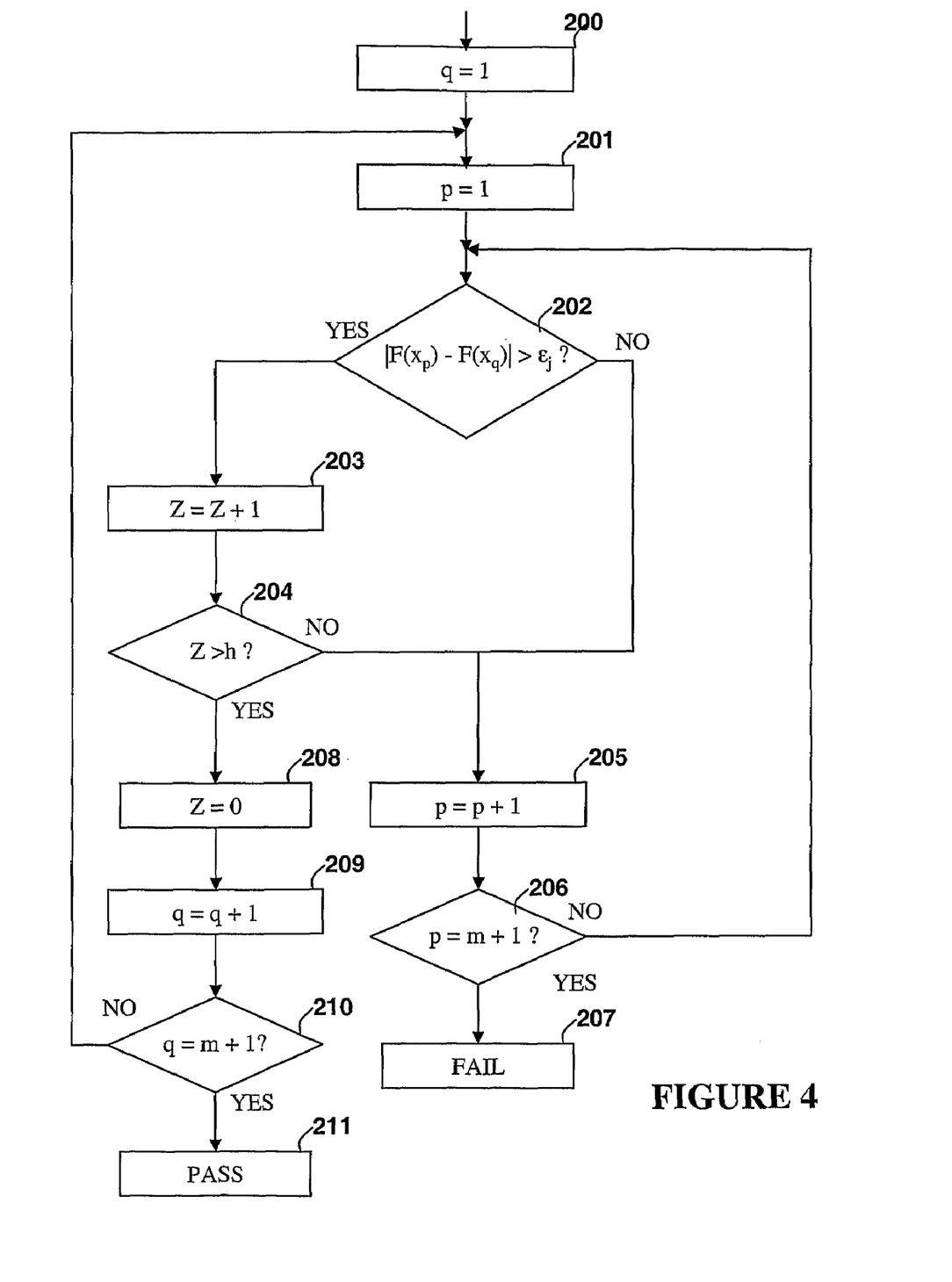

The above process is effective but rejects many candidate forks and is, therefore, slow. A faster but cruder alternative is to select elements at random until m-h have been found that match each other, and then looking for h random pixels that mismatch all of the first group of h pixels.

In this context a mismatch between two pixels means that they differ by ε or more in at least one colour component.

Figure 5:
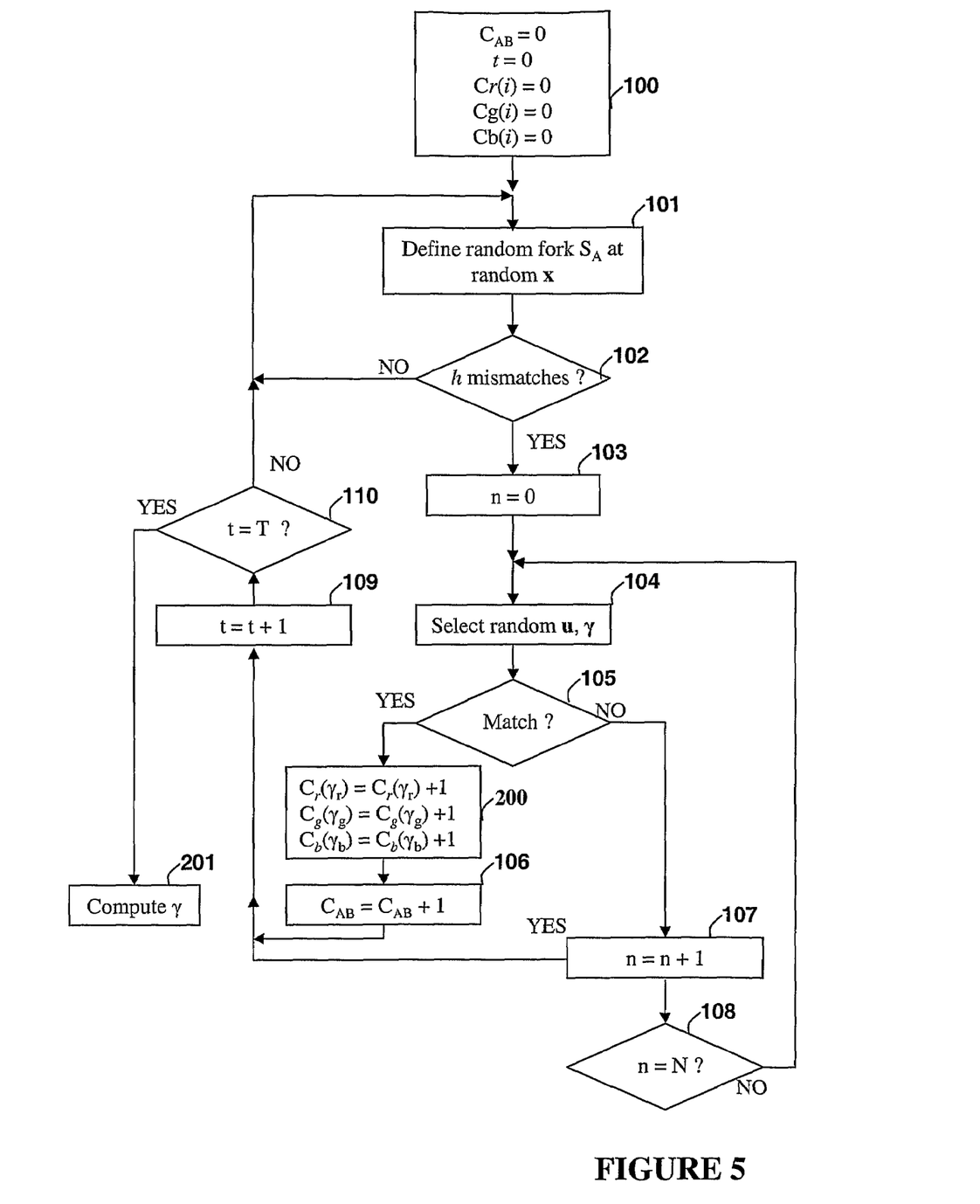

FIG. 5 is a flowchart showing the operation of a second embodiment of the invention. Steps that are identical to those of FIG. 3 are given the same reference numerals. Here, the object is not to generate a similarity score, but rather to estimate the colour difference between the two images, though the score $C_{AB}$ is still calculated, but for a different purpose. At the start, a set of counters $C_r(i)$, $C_g(i)$, $C_b(i)$ is initialised. The number of counters corresponds to the number of possible values of $\gamma_r$, $\gamma_g$, $\gamma_b$, so there are $3(\gamma_{MAX}+1)$ counters, corresponding to $i=0 \ldots \gamma_{MAX}$.

Figure 6:
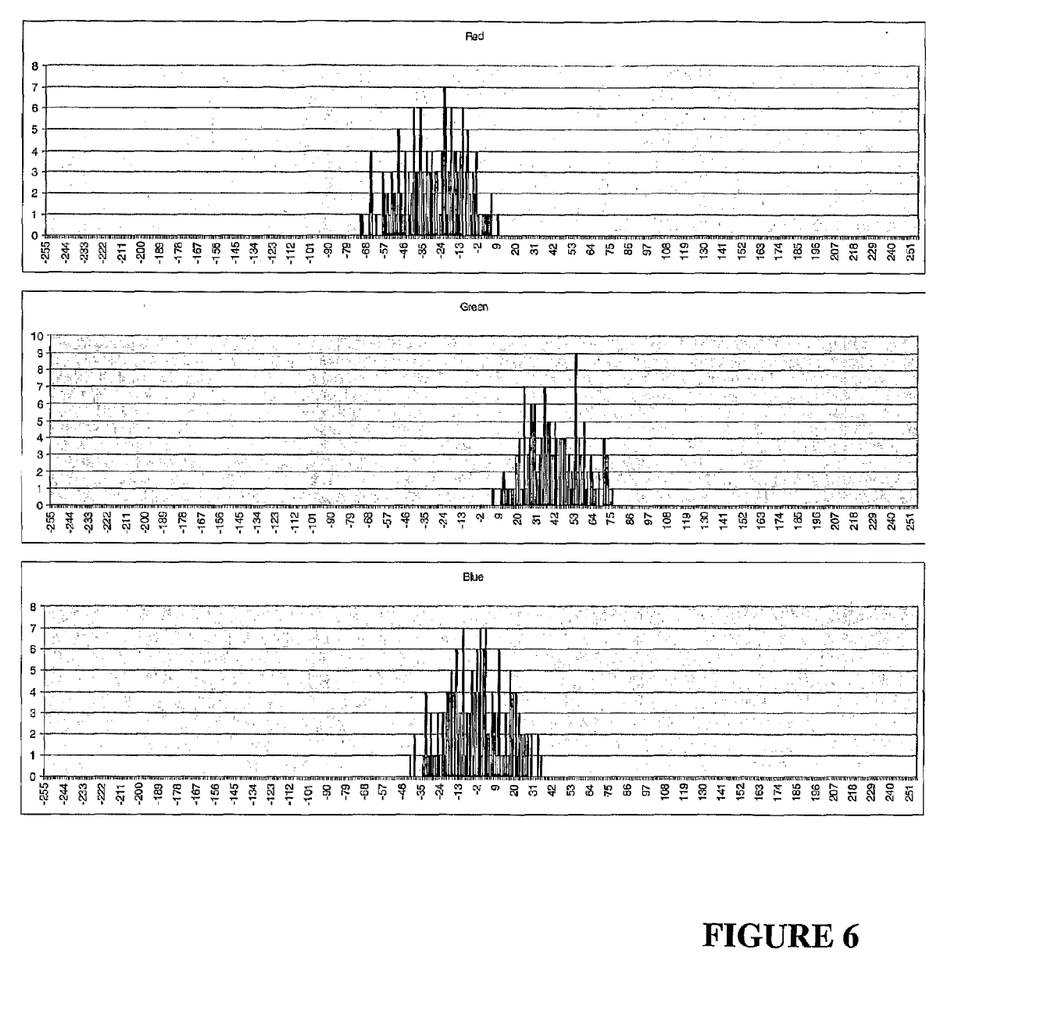
FIG. 6 depicts exempla comparison values for an embodiment.

Operation is then as before up to the point where a match is found. Then the value of γ that resulted in the match is recorded by incrementing the corresponding counters. Thus, at step 200 the counters $C_r(\gamma_r)$, $C_g(\gamma_g)$, $C_b(\gamma_b)$ are incremented. The remained of the iteration process is as before, until the limit T is reached at 110. At this point the counters $C_r(i)$, $C_g(i)$, $C_b(i)$ contain, in effect, three histograms indicating how successful each of the values of $\gamma_r, \gamma_g, \gamma_b$ have been in enabling matches to be obtained. FIG. 6 shows actual histograms plotted to show the results of a test in which image A was a photograph of a bowl of fruit under normal illumination and image B was the same scene but with a green cast. These results were obtained with T=500, m=6, N=500.

The next step is 201, where the aim is to determine a single, representative colour shift for each colour component. This is achieved by taking the average of the colour shifts that resulted in matches, that is to say the shift $\mu_{AB}=(\mu_r, \mu_g, \mu_b)$ given by $$\mu_r = \frac{\sum_{i=0}^{\gamma_{MAX}} iC_r(i)}{C_{AB}}$$

$$\mu_g = \frac{\sum_{i=0}^{\gamma_{MAX}} iC_g(i)}{C_{AB}}$$

$$\mu_b = \frac{\sum_{i=0}^{\gamma_{MAX}} iC_b(i)}{C_{AB}}.$$

Note that $C_{AB}$ was counted separately, but could alternatively be calculated from $$C_{AB} = \sum_{i=0}^{\gamma_{MAX}} C_b(i).$$

Of course, rather than counting the number of times each value occurs, the same result could be obtained by storing in a memory each value that resulted in a match, and then taking the average of the stored values.

For the example shown in FIG. 6, a value of $\mu_{AB}$=(−28, 42, 2) was obtained. If desired, this result can be subtracted from image B by way of a correction, that is to say, the original pixel values $b(u_i)$ are replaced by $b(u_i)-\mu_{AB}$. Or if image B is considered to be correct the correction could be added to image A.

As an alternative to taking the average, the values of $\mu_r$, $\mu_g$, $\mu_b$ could be obtained by estimating the position of the peak of the histogram. This may be done by looking for the maximum value, the median, or the position of a window of width w in which the sum of w values was maximised.

In practice it is found that good colour correction can be obtained in this manner. In tests, it has become clear that it is not necessary for colour correction purposes that the two images should be identical in all respects except brightness/colour. For example, good results have been observed in a case where image A covered only part of the scene shown in image B. More significantly, the images do not have to be of the same scene: it is only necessary to have a range of matching colour adjacencies that allow forks to match in both images in order to obtain a good estimate, though similar structures present in both images will allow a greater proportion of colour shifted forks to match and therefore produce a more statistically reliable colour shift estimate. This offers the opportunity for automatically tailoring images to individual preferences by simply supplying examples of acceptable images and allowing the system to adjust the colour balance accordingly. If desired, the system could be incorporated in a camera for setting the exposure or aperture, and/or (in a digital camera) for adjusting the colour balance at the time a photograph is taken, or immediately afterwards.

The introduction of random colour variations into the scoring process, as described above with reference to FIG. 3 can also be combined with the system described in our aforementioned international patent application WO2006/030173 which suggested the introduction of random variations in the number of tines m, and/or in the maximum fork diameter D and/or the fork shape to be applied to the second image (reflection, rotation, scaling). However, the more variables that are perturbed, the greater is the number of iterations need to produce a good result, so for fast performance one prefers to vary only two or three parameters at once.

Thus, in such an implementation, Step 105 of FIG. 3 would be preceded by one or more of the following steps for transformation of the displacements $d_i$:

A. a random reflection is applied to the fork:
  Choose a random integer R as 0 or 1;
  If R=1, set $d_{xi}=-d_{xi}$ for all i=1 . . . m. $d_{yi}$ are unchanged.
  This is a reflection about a single vertical axis. Reflections about other axes are encompassed by this reflection plus the rotation step that comes next.

B. choose a random rotation angle $\beta$ in the range $\beta_{max}$ to $\beta_{min}$. Then the fork represented by $d_i$ is rotated by this angle by performing, for each i:

$$d_{xi}'=d_{xi} \cos \beta - d_{yi} \sin \beta$$

$$d_{yi}'=d_{xi} \sin \beta + d_{yi} \cos \beta.$$

C. a random scale factor $\alpha$ is chosen in the range $\alpha_{min}$ to $\alpha_{max}$. The fork is then scaled by this factor:

$$d_{xi}''=\alpha.d_{xi}'$$

$$d_{yi}''=\alpha.d_{yi}'$$

The scaling and rotation are relative to (0,0), though scaling or rotation about any other centre would do just as well.

These processes has been described in terms of values representing the colour or brightness of elements of a two dimensional visual image. This would include a pattern that is viewable as a visual image even if it was not originally generated by detection of visible light, such as an x-ray image or tomography. It may be applied also to three-dimensional visual images (as in tomography), or to other patterns, especially where the values represent measurements where it may be of interest to identify a global shift which is hard to spot using conventional techniques; examples include measurements of magnetic fields, or of temperature.

What is claimed is:

1. A method of comparing a first pattern (A) represented by a first ordered set of $(X_i)$ each having a value with a second pattern (B) represented by a second ordered set of $(u_i)$ each having a value, comprising iteratively performing the steps of:
   (i) selecting a plurality of elements from the first ordered set;
   (ii) for each selected element of the first ordered set, selecting an element from the second ordered set, such that the selected elements of the second ordered set have, within the second ordered set, a set of positional relationships relative to each other that is the same as, or a transformation of, the set of positional relationships that the selected plurality of elements of the first ordered set have relative to each other;

(iii) determining whether the selected elements meet a match criterion; and (iv) in the event of a match, updating at least one similarity score ($S_{AB}$); characterized by, on each iteration, generating a random shift value ($\gamma$), and in that the match criterion is that the value of each of the selected elements of the first ordered set differs from the value of the correspondingly positioned selected element of the second ordered set by an amount that is equal to, or within a set margin of, and in the same sense as, said shift value.

2. A method of comparing a first pattern (A) represented by a first ordered set of elements ($x_i$) each having a value with a second pattern (B) represented by a second ordered set of element ($u_i$) each having a value, comprising iteratively performing the steps of:

(i) selecting a plurality of elements from the first ordered set;

(ii) for each selected element of the first ordered set, selecting an element from the second ordered set, such that the selected elements of the second ordered set have, within the second ordered set, a set of positional relationships relative to each other that is the same as, or a transformation of, the set of positional relationships that the selected plurality of elements of the first ordered set have relative to each other; and (iv) determining whether the selected elements meet a match criterion; characterized in that each iteration includes the step of generating a random shift value ($\gamma$); the match criterion is that the value of each of the selected elements of the first ordered set differs from the value of the correspondingly positioned selected element of the second ordered set by an amount that is equal to or within a set margin of, and in the same sense as, said shift value; and by, in the event of a match, recording the shift value; and, at the conclusion of said iteration, estimating from said recorded shift values a single representative shift value.

3. A method according to claim 2 including applying to one image a correction based on said single representative shift value.

4. A method according to claim 1 in which the selection of the parameter(s) is random or pseudo-random.

5. A method according to claim 1, in which each value (a) comprises a plurality of components, and the shift value has a corresponding number of components.

6. A method according to claim 1 in which the patterns are visual images and the components are brightness or color values.

7. A method according to claim 1, comprising firstly processing the first and second ordered set to identify regions thereof containing significant detail, and in which the selection of elements is constrained such that at least one of the selected elements of the first ordered set shall lie in the or an identified region of the first ordered set or that at least one of the selected elements of the first ordered set shall lie in the or an identified region of the first ordered set.

* * * * *